(12) United States Patent
Buckley et al.

(10) Patent No.: US 6,589,500 B1
(45) Date of Patent: Jul. 8, 2003

(54) METHOD AND APPARATUS FOR CONTROLLING UNIFORMITY OF CRYSTALLINE PRECIPITATES

(75) Inventors: Glyn Jeffrey Buckley, Wigan (GB); John William Stairmand, Chester (GB)

(73) Assignee: Accentus PLC, Didcot (GB)

( * ) Notice: Subject to any disclaimer, the term of this patent is extended or adjusted under 35 U.S.C. 154(b) by 0 days.

(21) Appl. No.: 09/374,762

(22) Filed: Aug. 16, 1999

(30) Foreign Application Priority Data

Sep. 4, 1998 (GB) ............................................ 98 19225

(51) Int. Cl.⁷ ............................. B01F 5/10; B01J 10/00; B01J 14/00
(52) U.S. Cl. ........................ 423/659; 422/224; 422/225
(58) Field of Search .......................... 423/659; 422/224, 422/225, 190, 198, 245.1

(56) References Cited

U.S. PATENT DOCUMENTS

| | | | | |
|---|---|---|---|---|
| 4,464,341 A | * | 8/1984 | Auchapt et al. ............ | 422/202 |
| 5,122,348 A | * | 6/1992 | St. Elmo Spence et al. | 423/122 |
| 5,466,063 A | * | 11/1995 | Puy et al. .................... | 366/6 |
| 5,707,634 A | * | 1/1998 | Schmitt ....................... | 424/440 |
| 5,806,976 A | * | 9/1998 | Roque ......................... | 366/338 |
| 5,855,776 A | * | 1/1999 | Bowe et al. ................ | 210/205 |
| 6,051,204 A | * | 4/2000 | Bowe et al. ................ | 423/659 |

FOREIGN PATENT DOCUMENTS

| | | | |
|---|---|---|---|
| DE | 198 19 982 | * | 9/1999 |
| EP | 0 449 454 | * | 10/1991 |
| EP | 0461930 | | 9/1995 |
| GB | 627043 | | 7/1949 |
| GB | 2 200 574 | * | 8/1988 |
| GB | 2 341 120 | * | 3/2000 |
| WO | 94/07582 | | 4/1994 |
| WO | 96/32095 | | 10/1996 |

* cited by examiner

Primary Examiner—Steven J Bos
(74) Attorney, Agent, or Firm—William H. Holt

(57) ABSTRACT

Solvent containing a product (or precursor for the product) and anti-solvent are introduced via tangential inputs respectively 17,18 of a fluidic vortex mixer 11. The emerging mix from axial outlet 20 is supplied directly to a precipitate entrapment device such as filter bed 12 so that precipitate is removed from the solution before the precipitated particles have time to grow. Filtrate is treated in a reduced pressure evaporator 13 to recover anti-solvent and return concentrated solution for combining with a product make up stream at 19 and return to tangential input 17 of the fluidic vortex mixer.

9 Claims, 1 Drawing Sheet

METHOD AND APPARATUS FOR CONTROLLING UNIFORMITY OF CRYSTALLINE PRECIPITATES

The invention relates to a method and apparatus for the manufacture of products in the form of controlled uniform size precipitates.

In the manufacture of a number of chemical products, particularly in the pharmaceutical industry, using a precipitation process, it is desired to achieve a high standard of uniformity of particle size in the precipitates and also to control the particle size, generally with the object of achieving a precipitate in the form of uniform small size crystallites. This can be difficult to achieve as crystal growth can occur rapidly and this leads to non-uniformities because of variations in the time periods for which different parts of the precipitate may be exposed to solvent containing unprecipitated solute.

The invention provides, in one of its aspects, a method for the manufacture of a product in the form of a controlled uniform particle size precipitate, which method comprises supplying to a first tangential input of a fluidic vortex mixer a solvent containing the product or a precursor therefor in solution, said fluidic vortex mixer having a second tangential input and an axial outlet, supplying to said second tangential input of the fluidic vortex mixer an anti-solvent, whereby rapid mixing of the solvent and anti-solvent takes place in the vortex mixer and a precipitate of the product or precursor therefor is produced in the solvent/anti-solvent mix emerging from said axial outlet of the vortex mixer, and feeding said emerging mix from the axial outlet directly into a precipitate entrapment device for entrapping the precipitate upon its emergence from said axial outlet for preventing or reducing further growth of said precipitate.

By anti-solvent we mean a fluid which promotes precipitation from the solvent of the product or precursor in solution in the solvent. Anti-solvent may thus have any one of a number of forms depending upon the particular product/precursor, the nature of the solvent and the precipitation process. For example, precipitation from a hot solution can be promoted by cooling, so that the anti-solvent can be a cold fluid. It may comprise the same liquid as the hot solvent or may be a different liquid and, preferably, to provide for continuous re-cycling, is more volatile than the solvent. Or the anti-solvent may comprise a cold gas or a fluid which promotes the precipitation via a chemical reaction or by its effect upon the solubility of the product or precursor in the solvent.

By precipitate entrapment device, we mean any device which will have the effect of so trapping the precipitate as to prevent, or reduce the possibility for, further growth of precipitate particles. For a product which precipitates as crystallites, the entrapment device conveniently comprises a filter medium.

The invention also provides apparatus for the manufacture of a product in the form of a controlled uniform particle size precipitate, which apparatus comprises a fluidic vortex mixer with a first tangential input connected to a source of solvent containing the product or a precursor therefor, and a second tangential input connected to a source of anti-solvent, the fluidic vortex mixer having an axial outlet connected directly into a precipitate entrapment device for entrapping precipitate upon its emergence from the axial outlet for preventing or reducing further growth of the precipitate.

In one arrangement according to the invention the entrapment device is a filter bed which has the effect of rapidly removing precipitate forming in the axial outlet of the vortex mixer from the solvent/anti-solvent mix containing a precipitated product or precursor therefor, and thus preventing or reducing the possibility of further growth of the precipitate.

In such an apparatus there is preferably provided a conduit for conveying the filtrate to a component, such as an evaporator, for concentrating and re-heating the solvent containing unprecipitated product or precursor therefor and separating anti-solvent. Evaporated anti-solvent may be collected and recovered for re-use by condensation and cooling as necessary. Heated solvent containing unprecipitated product or precursor therefor is combined with a product make-up stream for return to the first tangential input of the fluidic vortex mixer in a continuous process.

In certain manufacturing processes, the first stage of precipitation yields an oily phase which is, for example, a metastable form of the final crystalline product. For such processes, the entrapment device conveniently comprises a stirred tank, the oily precipitate emerging from the axial outlet of the fluidic vortex mixer as an emulsion containing small uniform oil particles. These are held in the tank and prevented from coalescing by the stirring for long enough for the oil particles to transform into solid crystallites, after which separation may be effected by, for example, filtration or centrifugation.

Recovered solvent/anti-solvent mix from this separation may be collected and recovered for re-use as described above.

Specific methods and constructions of apparatus embodying the invention will now be described by way of example and with reference to the drawings filed herewith, in which.

Figure 1:
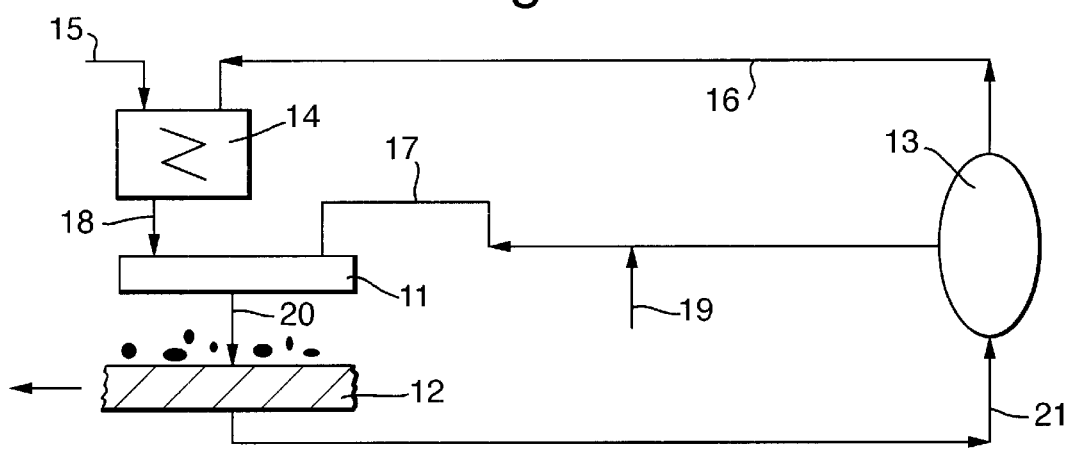
FIG. 1 is a block schematic diagram of an apparatus.

FIG. 1 illustrates a crystallisation facility made up of four key components: a fluidic vortex mixer 11, a filter bed 12, a reduced pressure distillation column 13 and a condenser and cooler vessel 14.

Anti-solvent from a supply (not shown) is introduced via pipeline 15 into the cooling region of the condenser and cooler vessel 14. A connection 16 provides for anti-solvent recovered from reduced pressure evaporator 13 to be supplied to the condenser and cooler vessel 14. A pipeline 17 is connected to a first tangential input of the fluidic vortex mixer 11 and is supplied with hot solvent containing product or a precursor therefor in solution from the combination of a product makeup supply at 19 and concentrate from the reduced pressure evaporator 13. Cold anti-solvent from the vessel 14 is fed at 17 into a second tangential input of the fluidic vortex mixer 11. An intimate mix of the hot solution and cold anti-solvent is formed very rapidly in the fluidic vortex mixer 11 and emerges at 20 to be received directly onto the filter bed 12, illustrated as a moving medium, which separates precipitated product (or product precursor) rapidly from the mix. Filtrate passing through the filter bed 12 is carried by pipeline 21 to the reduced pressure evaporator 13, in which filtrate containing unprecipitated product (or precursor) is concentrated, re-heated and returned together with product makeup 19 to the first tangential input of the fluidic vortex mixer 11.

In this example, the anti-solvent is the same liquid as the solvent (a typical example being isopropylalcohol) but, being cold, promotes precipitation by cooling the solution. It will be appreciated that the anti-solvent may comprise any suitable fluid that will effect the required precipitation on contact with the solution. If the anti-solvent is more volatile than the solvent, this will lead to more efficient operation of the reduced pressure evaporator 13. Indeed, if a cold gas or liquefied (e.g. liquefied carbon dioxide) gas is used as anti-solvent, then the function of the reduced pressure evaporator 13 will simply be to re-heat the filtrate and drive off entrained or dissolved gas. It may be convenient simply to vent such gas driven off in the reduced pressure evaporator 13, but if it is to be re-used, then it will need to be cooled (but not necessarily condensed).

Figure 2:
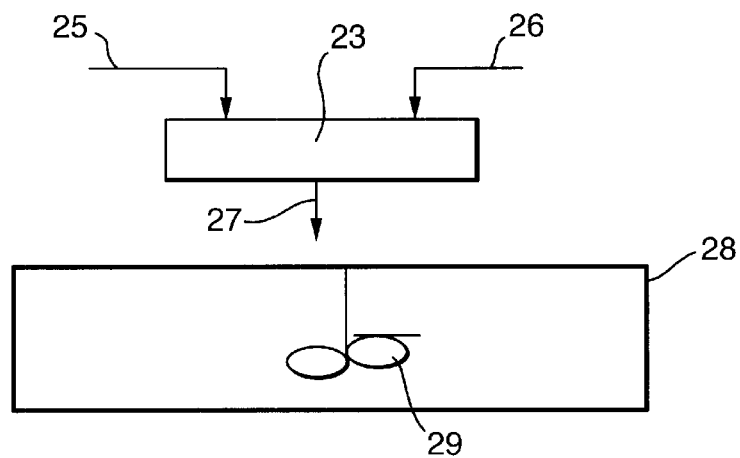
FIG. 2 is a block schematic diagram of another apparatus.

FIG. 2 illustrates a form of apparatus for use in a process in which precipitate first forms as an oily phase which eventually solidifies into crystalline product. Here again, fluidic vortex mixer 23 serves to form rapidly an intimate mix of hot solution supplied at 26 to a first tangential input and cold anti-solvent supplied at 25 to a second tangential input. The oily phase precipitate emerges from axial outlet 27 as an emulsion of dispersed oil particles. Formation of a fine emulsion comprising small uniform sized oil particles is encouraged by designing the fluidic vortex mixer 23 to have a large pressured differential across it typically > 10 bar.

Axial outlet 27 leads directly into the precipitate entrapment device which, in this example, comprises a receptacle or tank 28 provided with a stirrer 29 operated with sufficient vigour to maintain the emulsion in its finely dispersed state for long enough for the metastable oil particles to solidify as fine crystalline product.

In a process of this type, the anti-solvent is usually different from, but miscible with, the solvent. Typically a non-polar anti-solvent is used where the solvent is polar. For example, if isopropylalcohol is used as a polar solvent, non-polar methylene chloride may be used as a anti-solvent. Methylene chloride is miscible in isopropylalcohol but diminishes the properties of isopropylalcohol to dissolve solute and thus promotes precipitation. In another example, heptane may be used as non-polar anti-solvent.

Once solidified precipitate has formed, this can be separated by filtration or centrifugation and the filtrate recovered for re-use in a manner similar to that described with reference to FIG. 1. It will be appreciated that the principal of operation illustrated by FIG. 2 can be adapted for continuous operation by extending the stirred tank 28 into a continuous conduit or plug flow vessel in which agitation is maintained, the length of the conduit or vessel being such that the fine emulsion is maintained for long enough for the solidification to occur.

We claim:

1. A method for the manufacture of a product in the form of a controlled uniform particle size precipitate, which method comprises the steps of supplying to a first tangential input of a fluidic vortex mixer a solvent containing the product or a precursor therefor in solution, said fluidic vortex mixer having a second tangential input and an axial outlet, supplying to said second tangential input of the fluidic mixer an anti-solvent, whereby rapid mixing of the solvent and anti-solvent takes place in the vortex mixer and a precipitate of the product or precursor therefor is produced in the solvent/anti-solvent mix emerging from said axial outlet of the vortex mixer, and feeding said emerging mix from the axial outlet directly into a precipitate entrapment device for entrapping said precipitate upon its emergence from said axial outlet for preventing or reducing further growth of said precipitate.

2. Apparatus for the manufacture of a product in the form of a controlled uniform particle size precipitate, which apparatus comprises a fluidic vortex mixer with a first tangential input connected to a source of solvent containing the product or a precursor therefor, and a second tangential input connected to a source of anti-solvent; said apparatus further including a precipitate entrapment device, said fluidic vortex mixer having an axial outlet connected directly into said precipitate entrapment device for entrapping precipitate upon its emergence from said axial outlet for preventing or reducing further growth of said precipitate.

3. Apparatus as claimed in claim 2, wherein said entrapment device comprises a filter bed for rapidly removing precipitate forming in said axial outlet of the vortex mixer.

4. Apparatus as claimed in claim 3, wherein there is provided a conduit for conveying filtrate to means for concentrating and re-heating the solvent containing unprecipitated product or precursor therefor and separating anti-solvent.

5. Apparatus as claimed in claim 4, wherein collection means is provided for collecting and recovering evaporated anti-solvent for re-use by condensation and cooling.

6. Apparatus as claimed in claim 4, wherein said means for concentrating and re-heating the solvent containing unprecipitated product or precursor therefor comprises a reduced pressure evaporator.

7. Apparatus as claimed in claim 6, wherein a conduit is provided for combining heated solvent containing unprecipitated product or precursor therefor from the said evaporator with a product make-up stream for return to the first tangential input of the fluidic vortex mixer in a continuous process.

8. Apparatus as claimed in claim 2 for use in manufacturing processes in which the first stage of precipitation yields an oily phase emulsion, wherein said entrapment device comprises a receptacle, and means for maintaining said emulsion in a finely dispersed state in said receptacle with sufficient vigour and for a long enough time for metastable oil particles to solidify as fine crystalline product.

9. Apparatus has claimed in claim 8, wherein the said receptacle comprises a conduit or vessel of sufficient length in relation to the flow for the oily phase to solidify before leaving the receptacle.

\* \* \* \* \*